US012780170B2

(12) United States Patent
Böhm

(10) Patent No.: US 12,780,170 B2
(45) Date of Patent: Nov. 3, 2026

(54) METHOD FOR DETERMINING A CONTACT POSITION AND ELECTRICALLY ACTUATED MOTOR VEHICLE BRAKE

(71) Applicant: Continental Automotive Technologies GmbH, Hannover (DE)

(72) Inventor: Jürgen Böhm, Oberneisen (DE)

(73) Assignee: Continental Automotive Technologies GmbH, Hannover (DE)

( * ) Notice: Subject to any disclaimer, the term of this patent is extended or adjusted under 35 U.S.C. 154(b) by 89 days.

(21) Appl. No.: 18/257,283

(22) PCT Filed: Nov. 4, 2021

(86) PCT No.: PCT/DE2021/200174
§ 371 (c)(1),
(2) Date: Jun. 13, 2023

(87) PCT Pub. No.: WO2022/128004
PCT Pub. Date: Jun. 23, 2022

(65) Prior Publication Data

US 2024/0042985 A1 Feb. 8, 2024

(30) Foreign Application Priority Data

Dec. 14, 2020 (DE) ..................... 10 2020 215 831.2

(51) Int. Cl.
*B60T 17/22* (2006.01)
*B60Q 9/00* (2006.01)
(Continued)

(52) U.S. Cl.
CPC ................ *B60T 17/22* (2013.01); *B60Q 9/00* (2013.01); *B60T 8/172* (2013.01); *B60T 13/741* (2013.01)

(58) Field of Classification Search
CPC ......... B60Q 9/00; B60T 8/172; B60T 13/741; B60T 13/746; B60T 17/22; B60T 2270/406; F16D 2121/24
See application file for complete search history.

(56) References Cited

U.S. PATENT DOCUMENTS 6,536,562 B1 * 3/2003 Bohm ..................... F16D 65/56 188/71.7
2005/0194836 A1 9/2005 Simpson
(Continued)

FOREIGN PATENT DOCUMENTS

CN 104834210 A 8/2015
CN 105050873 A 11/2015
(Continued)

OTHER PUBLICATIONS

German Search Report dated Aug. 19, 2021 for the counterpart German Patent Application No. 10 2020 215 831.2.
(Continued)

*Primary Examiner* — Peter D Nolan
*Assistant Examiner* — Ce Li Li
(74) *Attorney, Agent, or Firm* — Buchanan Ingersoll & Rooney PC

(57) ABSTRACT

An electrically actuated motor vehicle brake and method are provided for determining a contact position of an electrically actuated motor vehicle brake along a displacement path of an actuator, with an initial contact position being verified using a reference contact position, and with the initial contact position being determined differently than the reference contact position.

20 Claims, 3 Drawing Sheets

(51) Int. Cl.

| | |
|---|---|
| ***B60T 8/172*** | (2006.01) |
| ***B60T 13/74*** | (2006.01) |

(56) References Cited

U.S. PATENT DOCUMENTS

| | | | | |
|---|---|---|---|---|
| 2007/0052289 | A1* | 3/2007 | Nilsson | F16D 66/02 303/155 |
| 2010/0193302 | A1 | 8/2010 | Schumann | |
| 2016/0001752 | A1* | 1/2016 | Yasui | B60T 8/172 701/70 |
| 2020/0086834 | A1 | 3/2020 | Wolff | |
| 2020/0319622 | A1* | 10/2020 | Fujiwara | H02P 23/20 |
| 2021/0302251 | A1* | 9/2021 | da Silva | H02P 23/14 |
| 2022/0073049 | A1* | 3/2022 | Beier | H02P 6/28 |
| 2023/0318501 | A1* | 10/2023 | Yamamoto | H02P 23/12 701/22 |

FOREIGN PATENT DOCUMENTS

| | | | |
|---|---|---|---|
| DE | 19730094 | A1 | 1/1999 |
| DE | 102004008383 | A1 | 9/2005 |
| EP | 1762746 | A2 | 3/2007 |
| JP | 2010-006165 | A | 1/2010 |
| WO | 2020143974 | A1 | 7/2020 |

OTHER PUBLICATIONS

The International Search Report and the Written Opinion of the International Searching Authority mailed on Feb. 24, 2022 for the counterpart PCT Application No. PCT/DE2021/200174.

European Examination Report dated Jul. 16, 2025 for the counterpart European Patent Application No. 21 806 987.0 and machine translation of same.

Chinese Office Action dated Sep. 24, 2025 for the counterpart Chinese Patent Application No. 202180082537.X and machine translation of same.

Office Action (The Second Office Action) issued Mar. 14, 2026, by the State Intellectual Property Office of People's Republic of China in corresponding Chinese Patent Application No. 202180082538.X and an English translation of the Office Action. (12 pages).

* cited by examiner

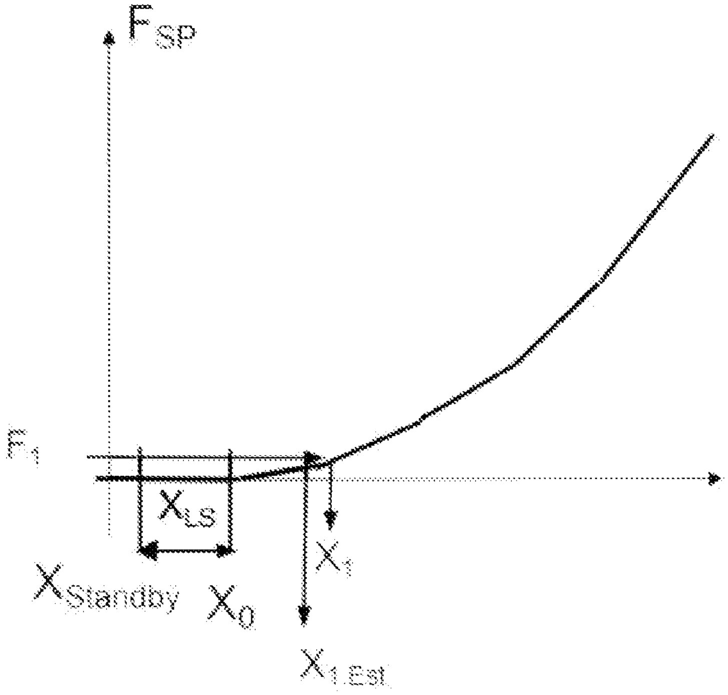
Fig. 4a
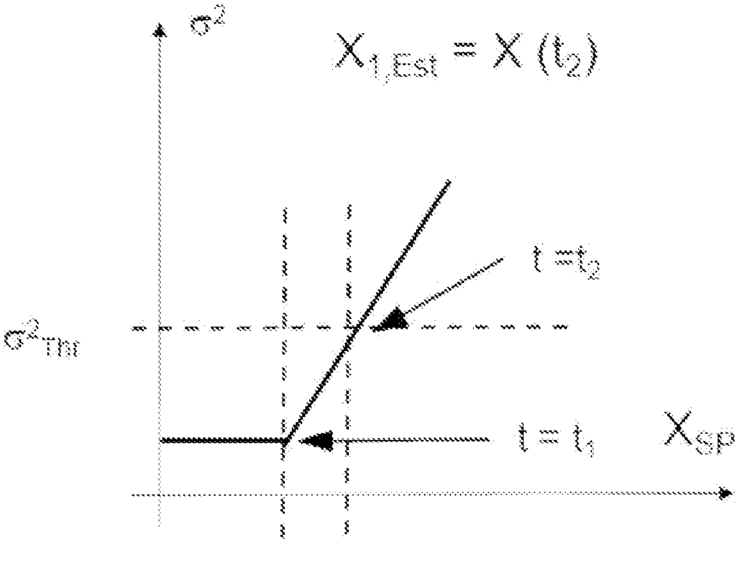
Fig. 4b
$$M_{Akt} = M_{Akt,A} - M_{Acc} = M_{Akt} - J_{Gesamt} * d\omega / dt$$
Fig. 5

METHOD FOR DETERMINING A CONTACT POSITION AND ELECTRICALLY ACTUATED MOTOR VEHICLE BRAKE

TECHNICAL FIELD

The embodiments relate to a method for determining a contact position of an electrically actuated motor vehicle brake along a displacement path and an associated electrically actuated motor vehicle brake.

BACKGROUND

Electrically actuated motor vehicle brakes may be designed for example as disk brakes or as drum brakes. Typically, an application force is generated by means of an electric motor, a primary transmission and a rotational/translational transmission. Typically used for measuring application forces is an application force sensor which is mounted in an application module housing and supplies a signal that corresponds to the force with which the brake linings are pressed against a brake disk or brake drum.

In principle, a contact position can also be determined by evaluating application forces. However, it has been found that, with known procedures, errors that may lead to problems in the control of the motor vehicle brake can occur.

SUMMARY

A method for determining a contact position of an electrically actuated motor vehicle brake along a displacement path of an actuator has the following steps: determining an initial contact position on the basis of a measurement of an application force, determining a reference contact position on the basis of a determination of a motor torque of the actuator, comparing the initial contact position with the reference contact position and, only if a deviation between the initial contact position and the reference contact position is at most as great as a threshold value, determining the initial contact position as the contact position.

With this method, the contact position is thus determined in two different ways and the results are compared with one another. The initial contact position is based on a measurement of an application force. In contrast, the reference contact position is based on a determination of a motor torque of the actuator. Sensors for current measurement which are already present in typical motors can be used for this purpose. The determination of a contact position can thus be reliably achieved.

The electrically actuated motor vehicle brake may be for example a disk brake or a drum brake. The term initial contact position is to be understood in such a way that it is a contact position which is first stored in the system and may only determined as a contact position, and thus processed further, if it matches the reference contact position in the course of the specified threshold value comparison. In this case, it can also be said that the initial contact position is output as the contact position. The reference contact position is the contact position with which the initial contact position is compared. The deviation that is compared with the threshold value may be an absolute deviation or a relative deviation. The threshold value can be specified accordingly. In the case of an absolute threshold value, a certain amount along the displacement path is typically specified. In the case of a relative threshold value, a certain percentage of the initial contact position is typically specified, where the reference contact position must be within an interval around the initial contact position, calculated using the percentage and the current value of the initial contact position, to determine the initial contact position as the contact position.

The reference contact position may be determined as follows: applying the motor vehicle brake starting from an unactuated position, thereby monitoring the motor torque, and determining the reference contact position on the basis of the motor torque.

An already existing possibility for motor torque determination, which is typically based on the measurement of a current consumption, can typically be used for this purpose. Additional expenditure on equipment is therefore not generated. The motor vehicle brake may for example be in its standby position at the start of this process and applied from there, the reference contact position being determined on the basis of the motor torque, as mentioned.

According to an embodiment, values are determined for the motor torque at successive points in time. After each determination of a value, a respective totality of a specified number of values from the immediate past is defined. The reference contact position may be determined as follows: after each definition of a totality, calculating a measure of dispersion over the totality, if the amount of the measure of dispersion is at least as great as a specified dispersion threshold value, determining a current position, and determining the reference contact position on the basis of the current position.

A totality may be understood for example as a group of values, while a number that should be included in a respective totality can be specified, for example at least five or at least ten and/or at most fifteen or at most twenty values, or also ten or fifteen values. The number may for example represent a number greater than one. The totality may be thought of as a sliding window, being shifted by one value each time a new value is determined. A new value thus means that the previously oldest value is no longer part of the totality. A certain averaging over the values can be achieved by using a measure of dispersion, it having been found that, when a motor vehicle brake transitions from a non-contacting state to a contacting state, such a measure of dispersion typically increases very sharply within a very short distance. A current position can thus be determined very exactly by the comparison with a specified dispersion threshold value. The current position is that at which the actuator is located along its displacement path precisely at the point in time when the dispersion threshold value is exceeded by the measure of dispersion. Based on this current position, the reference contact position can be determined.

The measure of dispersion may be for example an empirical variance. It is a quadratic measure of dispersion. This has proven for typical designs, since it increases very quickly in the case relevant here. However, other measures of dispersion can also be used.

For example, the reference contact position may be determined by subtracting a correction value from the current position. The correction value is typically a specified value that indicates a typical distance between the reference contact position and the current position. This may for example be determined experimentally for a specific type of brake.

According to an embodiment, the points in time have the same time intervals from one another. In other words, in such an embodiment a value for the motor torque is always measured after a specific time has elapsed. Accordingly, a new totality is always defined after such a predetermined time has elapsed, and the procedure already described, with calculation of a measure of dispersion and comparison of threshold values, is applied.

A current consumption of an electric motor of the actuator may be measured to determine the motor torque. A good conclusion about the motor torque can be drawn from such a current consumption without the need for a separate torque sensor. The motor torque can be calculated for example from the current consumption.

According to an embodiment, the motor torque is determined as follows: measuring a current consumption of an electric motor of the actuator, calculating an output motor torque on the basis of the current consumption, and calculating the motor torque by subtracting an acceleration torque of the electric motor from the output torque.

The output torque is therefore that torque which is calculated directly on the basis of a measured current consumption. The acceleration torque of the electric motor can be subtracted from this in order to arrive at the motor torque to be used in further calculations. The acceleration torque can be calculated for example as the product of the moment of inertia and the derivation of the angular velocity of the electric motor. Alternatively, it would also be possible to convert the output torque differently into the motor torque that is used in further calculations.

According to an advantageous embodiment, the method may also have the following steps: comparing the initial contact position with a lower limit value and/or an upper limit value, and determining the initial contact position as a contact position only if the initial contact position is at least as great as the lower limit value and/or if the initial contact position is at most as great as the upper limit value.

Such an embodiment allows upper and lower limit values to be specified, so that it is possible to avoid the output of incorrect contact positions that are clearly outside the range to be expected. If the initial contact position is less than the lower limit value and/or if the initial contact position is greater than the upper limit value, an error message can preferably be output.

For example, the initial contact position can be determined as follows:

applying the motor vehicle brake starting from an unactuated position, thereby monitoring the application force, if the application force reaches an application force threshold value, determining a current position, and determining the initial contact position on the basis of the current position.

The current position may be the position at which the application force reaches the application force threshold value. For example, the initial contact position can be determined by subtracting a further correction value from the current position. This has proven to be a reliable determination of an initial contact position. The further correction value is referred to as a further correction value in order to linguistically differentiate it from the correction value already mentioned further above, which is used in the context of determining the reference contact position. In principle, this is also a correction value.

For example, if the deviation between the initial contact position and the reference contact position is greater than the threshold value, an error message can be output.

Typically, an error message does not result in the motor vehicle brake being switched off, but rather it is possible for example to refrain from taking into account a determined value that led to the error message for updating a clearance position or for other control purposes.

However, an error message may for example also result in a warning being issued to a driver of the motor vehicle.

For example, the position may be determined on the basis of a measured motor angle. A transmission ratio may be used for this, where the position of the actuator is typically the transmission ratio multiplied by the motor angle. A motor angle sensor that is used may be designed in such a way that it does not have a fixed reference point, but can only record changes in the angle and complete revolutions. It is also possible to carry out the method in this case, since the contact positions can be determined relative to one another.

An electrically actuated motor vehicle brake is configured to carry out a method described herein. With regard to the method, reference can be made to all of the embodiments and variants described herein. Safety may be increased, since an initial contact position is only used as a contact position if it withstands a threshold value comparison with the reference contact position, which is determined in a different way.

An electrically actuated motor vehicle brake may have one or more brake shoes and a brake disk or a brake drum. It may also have an actuator which has an electric motor to drive it and which is designed to press the brake shoes against the brake disk or against the brake drum. Furthermore, the motor vehicle brake may typically have at least one application force sensor and a device for measuring a current consumption of the electric motor. It may also have an electronic control device which is configured to carry out a method.

BRIEF DESCRIPTION OF THE DRAWINGS

A person skilled in the art will take further features and advantages from the exemplary embodiment described below with reference to the appended drawing, in which:

FIGS. 4*a*, 4*b*: show a procedure for determining a reference contact position, and FIG. 5: shows a calculation rule.

DETAILED DESCRIPTION

Figure 1:
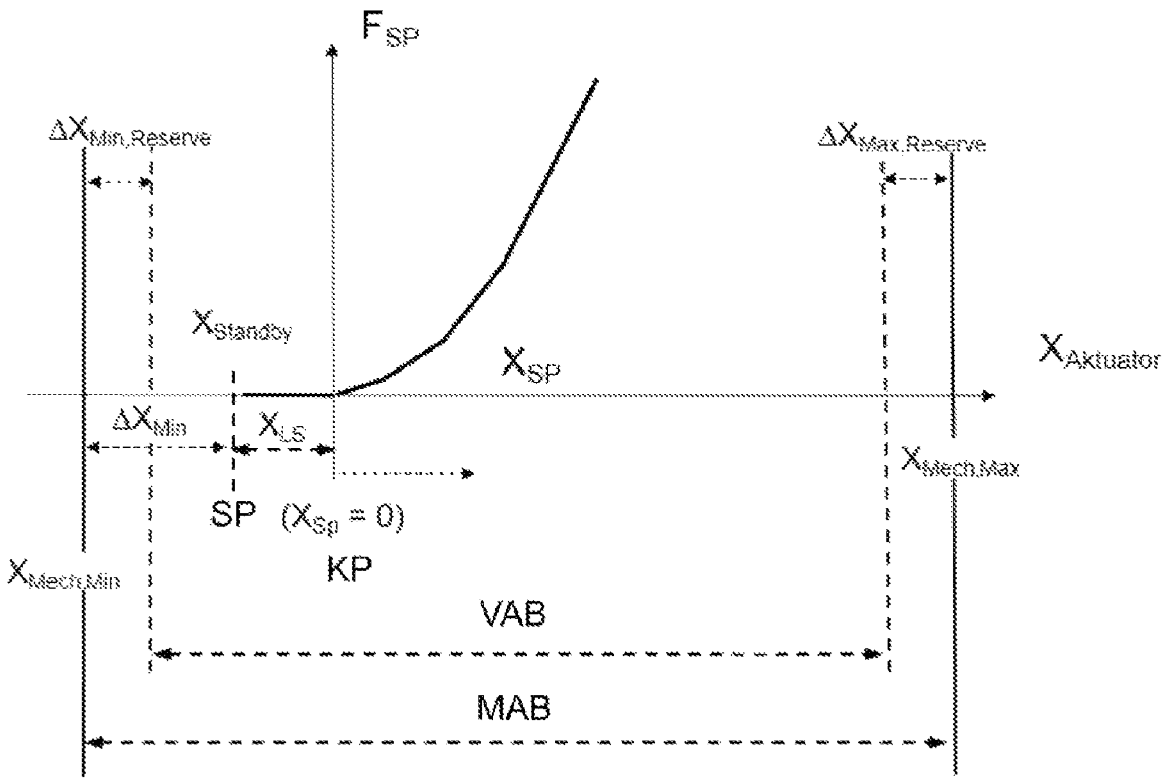
FIG. 1: shows a displacement path of an actuator and associated forces.

FIG. 1 schematically shows a displacement path of an actuator and associated application forces.

The displacement path, also referred to as the working range, of an electrically actuated motor vehicle brake is typically limited and is constructively determined by the mechanical structure. It is typically chosen such that a thickness of a brake disk or brake drum, a thickness of friction linings, a lining clearance to be set and a sufficient position reserve can be taken into account. FIG. 1 shows by way of example an arrangement for a case in which an electrically actuated motor vehicle brake is equipped with new linings. A position $X_{Actuator}$ along a displacement path is indicated on the horizontal axis and an application force $F_{SP}$ is indicated along the vertical axis. The maximum possible working range MAB runs between the limits $X_{Mech,\ Min}$ and $X_{Mech,\ Max}$. Within this range there is an available working range VAB between the limits, depicted by the distances $\Delta X_{Min,\ Reserve}$ and $\Delta X_{Max,\ Reserve}$. At a distance $\Delta X_{Min}$ from the left end there is a standby position SP, to be precise at a position $X_{Standby}$. At a further distance $X_{LS}$, which indicates the clearance, there is a contact position KP. This defines the zero point of a coordinate system of an application position $X_{SP}$ in the horizontal direction, i.e. $X_{SP}=0$. As can be easily seen from FIG. 1, the application force $F_{SP}$ is zero to the left of the contact position KP and increases more than linearly to the right of it. This application force $F_{SP}$ can be measured and also used for determining the contact position KP.

A motor angle sensor, which provides an angle signal of a motor angle $\varphi_{Motor}$, is available for determining the position $X_{Actuator}$ or application position $X_{SP}$. Such a motor angle sensor is typically already present, for example in the case of electrically commutated motors, for the purpose of motor control. The motor angle $\varphi_{Motor}$ and the position $X_{Actuator}$ are linked to each other via a transmission ratio i:

$$X_{Actuator}=i*\varphi_{Motor}.$$

Such a motor angle sensor is typically a sensor that can only measure motor rotations relatively, but not with respect to an absolute reference point. Thus, for example, a position relative to an ad hoc defined reference point, for example a specific contact position, can be considered. The method described herein may be implemented in such a way that such a motor angle sensor without an absolute reference point is sufficient. It is therefore possible to dispense with a motor angle sensor with an absolute reference point.

The standby position $X_{Standby}$ is the position with a defined distance $X_{LS}$ from the lining to the brake disk or brake drum, into which the actuator is moved when there is no force requirement. It is also referred to as the clearance position. The contact position KP represents the position at which the linings are just in contact with the brake disk or brake drum and, with regard to the actuation of a wheel brake, represents the transition from force-free movement to forceful movement. Knowing this contact position KP is typically important for a force control system so that, for example, the standby position $X_{Standby}$ can be approached correctly and in this position a defined distance between the brake linings and the brake disk or the brake drum can be set.

Figure 2:
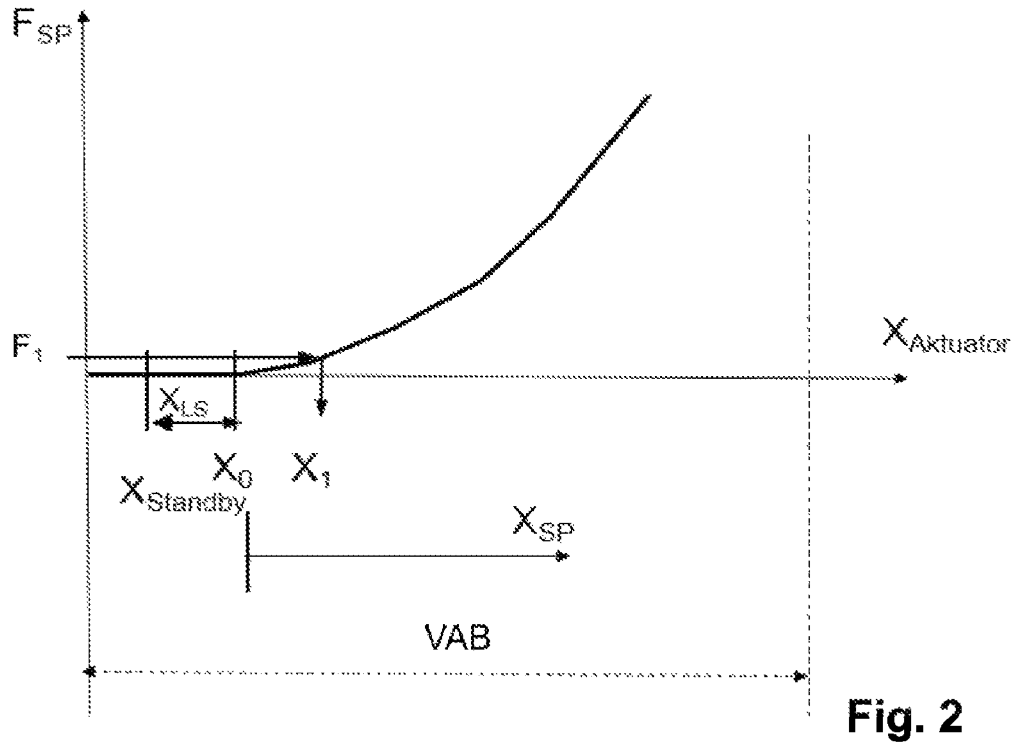
FIG. 2: shows a determination of an initial contact position.

FIG. 2 shows an procedure for determining an initial contact position. The motor vehicle brake is applied, so that, starting from the standby position $X_{Standby}$, the position first overcomes the clearance and then, at the contact position KP, contact is achieved between the brake linings and the brake disk or brake drum. However, this cannot yet be measured directly. For this reason, application is initially continued until the application force $F_{SP}$ reaches an application force threshold value $F_1$. If such a threshold value crossing is detected, the actuator is in a current position $X_1$. A further correction value, which indicates a typical, for example empirically determined, distance between the current position and the contact position, is then subtracted from this. This allows an exact determination of the contact position KP, which is included as the initial contact position in the method to be described further. A contact position which is determined by means of an application force measurement is typically referred to as the initial contact position.

The process just described can be carried out, for example, during an initialization. This involves defining a zero point $X_0$, which from its determination as the zero point of the coordinate system serves for the application position $X_{SP}$.

Such a determination of a zero point can take place, for example, during an initialization or when the motor vehicle brake is actuated due to a braking force requirement. In principle, however, errors can also occur, for example due to an erroneous signal from the application force sensor. If such an error is not recognized and a zero point of the coordinate system is accordingly shifted, this can lead, for example, to an increased clearance or also to a reduced clearance, and thus to a changed response behavior.

Figure 3:
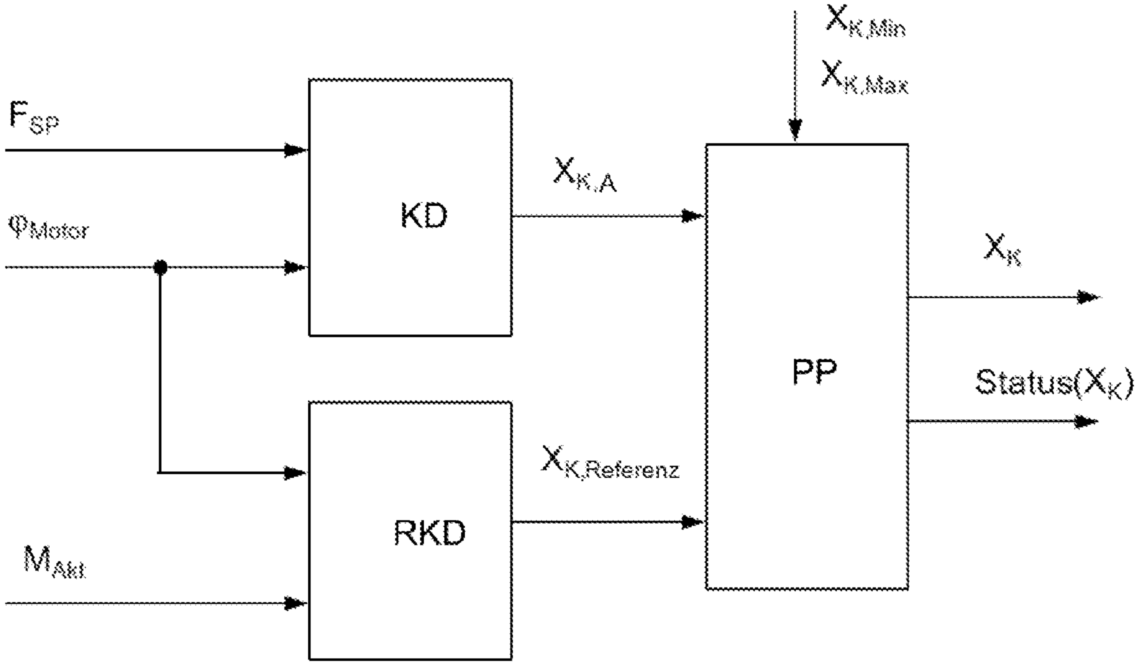
FIG. 3: shows a procedure for determining an initial contact position.

Therefore, a plausibility check of the initial contact position may take place, as shown in FIG. 3. First, a contact detection KD on the basis of the application force $F_{SP}$ and a motor angle $\varphi_{Motor}$ is carried out. This can take place in particular as explained with reference to FIG. 2. The initial value of this contact detection KD is the initial contact position $X_{K,\ A}$, which is included in a plausibility check PP. In addition, a reference contact detection RKD is carried out, to be precise on the basis of a motor torque $M_{Act}$ and the already mentioned motor angle $\varphi_{Motor}$. How this is done will be explained further below with reference to FIG. 4. The initial value of the reference contact detection is a reference contact position $X_{K,\ Reference}$, which is also included in the plausibility check.

In the plausibility check PP, a difference between the initial contact position $X_{K,\ A}$ and the reference contact position $X_{K,\ Reference}$ is determined, and this difference is in turn compared with a specified threshold value. If the difference is less than or equal to the threshold value, a comparison with a lower limit value $X_{K,\ Min}$ and an upper limit value $X_{K,\ Max}$ is additionally carried out. If the initial contact position $X_{K,\ A}$ is between these two lower and upper limit values $X_{K,min}$, $X_{K,\ Max}$, it can be output, i.e. the initial contact position $X_{K,\ A}$ is determined or adopted and accordingly output as the contact position $X_K$. In addition, a status signal Status($X_K$) is set to one to indicate that a verified contact position is present. Otherwise, i.e. if the difference is greater than the threshold value or if the initial contact position $X_{K,\ A}$ lies outside the range defined by the two lower and upper limit values $X_{K,\ min}$, $X_{K,\ Max}$, the status signal Status($X_K$) is set to zero, which corresponds to an error message and indicates that no new verified contact position could be determined, and thus, for example, the previously known contact position is still valid.

By using the upper and lower limit values $X_{K,\ min}$ and $X_{K,\ Max}$, geometrical conditions can be taken into account for example, it being possible to prevent an erroneous signal that clearly lies outside a permissible range from being output.

FIGS. 4*a*, 4*b* and 5 show the procedure for determining the reference contact position $X_{K,Reference}$. FIG. 4*a* shows a relationship between position and application force, FIG. 4*b* shows a progression of a measure of dispersion, and FIG. 5 shows a calculation rule. In principle, a current consumption of the electric motor of the actuator is initially measured while the motor vehicle brake is being applied. Based on this, an output motor torque $M_{Act,A}$ is first calculated. From this, an acceleration torque $M_{Acc}$ of the actuator, which is the product of the moment of inertia $J_{Total}$ and the derivative of the angular velocity ω, is calculated. The motor torque $M_{Act}$ ultimately to be used may thus calculated as follows:

$$M_{Act}=M_{Act,A}-M_{Acc}=M_{Act}-J_{Total}*d\omega/dt$$

The signal ω represents the angular velocity of the electric motor and can be determined from the motor angle $\varphi_{Motor}$ by differentiation.

The motor torque $M_{Act}$ determined in this way follows a progression similar to the application force $F_{SP}$, which is plotted in FIG. 4*a*.

However, it has been found that the motor torque $M_{Act}$ determined in this way is subject to relatively strong fluctuations in practice. Therefore, it is difficult to determine the reference contact position on the basis of a simple threshold comparison. Therefore, a measure of dispersion over a totality of in each case a predetermined number of lastdetermined values of the motor torque $M_{Act}$ may be formed, and this measure of dispersion can be compared with a dispersion threshold value. A corresponding procedure is shown in FIG. 4*b*. A variance $\sigma^2$ is plotted there and, as can be seen, this variance $\sigma^2$ increases sharply from the contact position. At a first point in time $t_1$, this increase in the variance $\sigma^2$ begins, and at a second point in time $t_2$ it is determined that it exceeds a specified dispersion threshold value $\sigma^2_{Thr}$. At this point in time $t_2$, the actuator is at a current position $X_{1,\ Est}$, which is shown in FIG. 4*a* and from which, in turn, a specified correction value is subtracted. This determines the reference contact position $X_{K,\ Reference}$, which is included in the verification of the initial contact position $X_{K,\ A}$ described with reference to FIG. 3.

To calculate the variance $\sigma^2$, for example first a mean value μ can be calculated as the expected value E of the totality of N values up to a value k:

$$\mu(k)=E\{M_{Act}\}=(M_{Act}(k)+M_{Act}(k-1)+\ldots+M_{Act}(k-N+1))/N$$

Based on this, the variance $\sigma^2$ can finally be calculated as follows:

$$\sigma^2(k)=E\{(M_{Act}-\mu(k))^2\}=\big((M_{Act}(k)-\mu(k))^2+(M_{Act}(k-1)-\mu(k))^2+\ldots+(M_{Act}(k-N+1)-\mu(k))^2\big)/(N-1)$$

This is an empirical variance, since it is a measured variable or a variable calculated from measured values and not a random variable in the strict sense.

As long as the linings are not in contact with the brake disk or the brake drum, the variance is typically very small. The mean value μ corresponds to a basic friction torque $M_0$. After applying the linings, the variance $\sigma^2$ increases very quickly and significantly since the mean value μ changes. This is due to the fact that the motor torque increases due to the application force acting.

The procedure described may prevent a possibly erroneous contact position, obtained on the basis of an application force measurement, from being used further and leading to problems such as incorrect control of the motor vehicle brake.

Overall, the procedure described here can be used to ensure that only verified values of a contact position are used. This can increase safety when operating a motor vehicle brake.

Aforementioned steps of the method can be carried out in the order indicated. However, they can also be carried out in a different order, insofar as is technically appropriate. In one of its embodiments, for example with a specific combination of steps, the method can be carried out in such a way that no further steps are carried out. However, in principle, further steps can also be carried out, including steps that have not been mentioned.

It is pointed out that features may be described in combination in the claims and in the description, for example in order to facilitate understanding, even though these can also be used separately from one another. A person skilled in the art will recognize that such features, independently of one another, can also be combined with other features or feature combinations.

The invention claimed is:

1. A method for determining a contact position of an electrically actuated motor vehicle brake along a displacement path of an actuator, the method comprising:

determining an initial contact position on the basis of a measurement of an application force;

determining a reference contact position on the basis of a determination of a motor torque of the actuator;

comparing the initial contact position with the reference contact position;

determining the initial contact position as the contact position when a deviation between the initial contact position and the reference contact position is less than or equal to a threshold value;

determining respective motor torque values at successive points in time and, after each determination of a motor torque value, calculating a respective total of a specified number of previous motor torque values;

determining the reference contact position on the basis of the determined motor torque values; and applying the motor vehicle brake starting from an unactuated position, thereby monitoring the motor torque values.

2. The method as claimed in claim 1, further comprising:

determining the reference contact position by;

defining a totality of motor torque values;

calculating a measure of dispersion over the totality of motor torque values after each defining of the totality of motor torque values when the measure of dispersion is at least as great as a specified dispersion threshold value; and determining a current position; and determining the reference contact position on the basis of the current position.

3. The method as claimed in claim 2, wherein the measure of dispersion is an empirical variance.

4. The method as claimed claim 2, further comprising determining the reference contact position by subtracting a correction value from the current position.

5. The method as claimed in claim 2, wherein the points in time have the same time intervals from one another.

6. The method as claimed claim 1, further comprising measuring a current consumption of an electric motor of the actuator to determine the motor torque.

7. The method as claimed in claim 1, wherein determining the motor torque further comprises:

measuring a current consumption of an electric motor of the actuator;

calculating an output motor torque on the basis of the current consumption; and calculating the motor torque by subtracting an acceleration torque of the electric motor from the output torque.

8. The method as claimed in claim 1 further comprising:

comparing the initial contact position with at least one of a lower limit value and an upper limit value; and determining the initial contact position as the contact position when at least one of the initial contact position is greater than or equal to the lower limit value and the initial contact position is less than or equal to the upper limit value.

9. The method as claimed in claim 8, further comprising outputting an error message when at least one of the initial contact position is less than the lower limit value and the initial contact position is greater than the upper limit value.

10. The method as claimed in claim 1, wherein determining the initial contact position further comprises:

applying the motor vehicle brake starting from an unactuated position, thereby monitoring the application force;

determining a current position when the application force reaches an application force threshold value; and determining the initial contact position on the basis of the current position.

11. The method as claimed in claim 10, further comprising determining the initial contact position by subtracting a further correction value from the current position.

12. The method as claimed in claim 1, further comprising outputting an error message when the deviation between the initial contact position and the reference contact position is greater than a threshold value.

13. The method as claimed in claim 1, further comprising determining the position on the basis of a measured motor angle.

14. The method as claimed in claim 1, wherein the deviation is one of an absolute deviation and a relative deviation.

15. An electrically actuated motor vehicle brake comprising:

an actuator having a motor;

a controller with instructions for:

determining an initial contact position on the basis of a measurement of an application force;

determining a reference contact position on the basis of a determination of a motor torque of the actuator;

comparing the initial contact position with the reference contact position; and determining the initial contact position as the contact position when a deviation between the initial contact position and the reference contact position is less than or equal to a threshold value;

determining respective motor torque values at successive points in time and, after each determination of a motor torque value, calculating a respective total of a specified number of previous motor torque values determining the reference contact position on the basis of the determined motor torque values; and applying the motor vehicle brake starting from an unactuated position, thereby monitoring the motor torque values.

16. The brake as claimed in claim 15, further comprises instructions for:

determining the reference contact position by;

defining a totality of motor torque values;

calculating a measure of dispersion over the totality of motor torque values after each defining of the totality of motor torque values when the measure of dispersion is at least as great as a specified dispersion threshold value; and determining a current position; and determining the reference contact position on the basis of the current position.

17. The brake as claimed in claim 15, wherein determining the motor torque further comprises:

measuring a current consumption of an electric motor of the actuator;

calculating an output motor torque on the basis of the current consumption; and calculating the motor torque by subtracting an acceleration torque of the electric motor from the output torque.

18. The brake as claimed in claim 15, further comprising:

comparing the initial contact position with at least one of a lower limit value and an upper limit value; and determining the initial contact position as the contact position when at least one of the initial contact position is greater than or equal to the lower limit value and the initial contact position is less than or equal to the upper limit value.

19. The brake as claimed in claim 15, wherein determining the initial contact position further comprises:

applying the motor vehicle brake starting from an unactuated position, thereby monitoring the application force;

determining a current position when the application force reaches an application force threshold value; and determining the initial contact position on the basis of the current position.

20. The brake system as claimed in claim 15, wherein the deviation is one of an absolute deviation and a relative deviation.

* * * * *